United States Patent
Kojima et al.

(10) Patent No.: US 11,657,515 B2
(45) Date of Patent: May 23, 2023

(54) DEVICE, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/389,369

(22) Filed: Jul. 30, 2021

(65) Prior Publication Data

US 2022/0051415 A1 Feb. 17, 2022

(30) Foreign Application Priority Data

Aug. 17, 2020 (JP) .............................. JP2020-137583

(51) Int. Cl.
*G06T 7/215* (2017.01)
*G06T 7/254* (2017.01)
(Continued)

(52) U.S. Cl.
CPC ............ *G06T 7/215* (2017.01); *G06T 7/0004* (2013.01); *G06T 7/254* (2017.01); *G06T 7/277* (2017.01);
(Continued)

(58) Field of Classification Search
CPC ......... G06T 7/215; G06T 7/254; G06T 7/277; G06T 7/70; G06T 7/0004; G06T 2207/30232; G06V 20/52; G06V 30/10
(Continued)

(56) References Cited

U.S. PATENT DOCUMENTS

2015/0208015 A1 7/2015 Takahashi
2015/0244992 A1 8/2015 Buehler
(Continued)

FOREIGN PATENT DOCUMENTS

JP 2009017416 A 1/2009
JP 2015162232 A 9/2015
(Continued)

OTHER PUBLICATIONS

Extended European Search Report for European Patent Application No. 21189266.6 issued by the European Patent Office dated Jan. 4, 2022.
(Continued)

*Primary Examiner* — Allen C Wong

(57) ABSTRACT

There is provide a device including: a first storage unit configured to store, when an object moves between separate image capturing areas which are captured by a plurality of surveillance cameras, a plurality of movement histories of the object between image data respectively captured by the surveillance cameras; an identification unit configured to identify, among the plurality of surveillance cameras, one surveillance camera that has captured a target object to track, and an image capturing time, according to an operation of an operator; and an estimation unit configured to estimate at least one other surveillance camera that is different from the one surveillance camera and that captures the target object, among the plurality of surveillance cameras, and an estimated time when the other surveillance camera captures the target object, based on the movement history and an identification result obtained by the identification unit.

20 Claims, 4 Drawing Sheets

(51) Int. Cl.
  *G06T 7/277* (2017.01)
  *G06T 7/70* (2017.01)
  *G06V 20/52* (2022.01)
  *G06T 7/00* (2017.01)
  *G06V 30/10* (2022.01)

(52) U.S. Cl.
  CPC ............... *G06T 7/70* (2017.01); *G06V 20/52* (2022.01); *G06T 2207/30232* (2013.01); *G06V 30/10* (2022.01)

(58) Field of Classification Search
  USPC .......................................................... 382/103
  See application file for complete search history.

(56) References Cited

U.S. PATENT DOCUMENTS

| | | | |
|---|---|---|---|
| 2016/0261808 A1* | 9/2016 | Tojo | .................. H04N 5/23203 |
| 2017/0070657 A1 | 3/2017 | Yokomizo | |
| 2019/0026560 A1* | 1/2019 | Nishikawa | ................ G06T 7/70 |
| 2019/0043207 A1 | 2/2019 | Carranza | |

FOREIGN PATENT DOCUMENTS

| | | |
|---|---|---|
| WO | 2014021004 A1 | 2/2014 |
| WO | 2018116488 A1 | 6/2018 |

OTHER PUBLICATIONS

Yunyoung Nam et al: "Inference topologyof distributed camera networks with multiple cameras", Multimedia Tools and Application., vol. 67, No. 1, Mar. 14, 2012 (Mar. 14, 2012) pp. 289-309, XP055362524,usISSN: 1380-7501, DOI:10.1007/sll042-012-0997-0.

Office Action issued for counterpart Japanese Application No. 2020-137583, issued by the Japanese Patent Office on Feb. 28, 2023 (drafted on Feb. 20, 2023).

* cited by examiner

DEVICE, METHOD AND STORAGE MEDIUM

The contents of the following Japanese patent application(s) are incorporated herein by reference:
 2020-137583 filed in JP on Aug. 17, 2020

BACKGROUND

1. Technical Field

The present invention relates to a device, a system, a method, and a recording medium.

2. Related Art

In the related art, various security systems using surveillance cameras have been proposed (for example, refer to Patent Document 1).
[Patent Document 1] Japanese Patent Application Publication No. 2015-162232

SUMMARY

A first aspect of the present invention provides a device. The device may include a first storage unit configured to store, when an object moves between separate image capturing areas which are captured by a plurality of surveillance cameras, a plurality of movement histories of the object between image data respectively captured by the surveillance cameras. The device may include an identification unit configured to identify, among the plurality of surveillance cameras, one surveillance camera that has captured a target object to track, and an image capturing time, according to an operation of an operator. The device may include an estimation unit configured to estimate at least one other surveillance camera that is different from the one surveillance camera and that captures the target object, among the plurality of surveillance cameras, and an estimated time when the other surveillance camera captures the target object, based on the movement history and an identification result obtained by the identification unit.

A second aspect of the present invention provides a system. The system may include the device according to the first aspect. The system may include the plurality of surveillance cameras configured to capture images in the separate image capturing areas.

A third aspect of the present invention provides a method. The method may include storing, when an object moves between separate image capturing areas which are captured by a plurality of surveillance cameras, a plurality of movement histories of the object between image data respectively captured by the surveillance cameras. The method may include identifying, among the plurality of surveillance cameras, one surveillance camera that has captured a target object to track, and an image capturing time, according to an operation of an operator. The method may include estimating at least one other surveillance camera that is different from the one surveillance camera and that captures the target object, among the plurality of surveillance cameras, and an estimated time when the other surveillance camera captures the target object, based on the movement history and an identification result obtained by the identifying.

A fourth aspect of the present invention provides a recording medium having recorded thereon a program. The program may cause a computer to function as a first storage unit configured to store, when an object moves between separate image capturing areas which are captured by a plurality of surveillance cameras, a plurality of movement histories of the object between image data respectively captured by the surveillance cameras. The program may cause the computer to function as an identification unit configured to identify, among the plurality of surveillance cameras, one surveillance camera that has captured a target object to track, and an image capturing time, according to an operation of an operator. The program may cause the computer to function as an estimation unit configured to estimate at least one other surveillance camera that is different from the one surveillance camera and that captures the target object, among the plurality of surveillance cameras, and an estimated time when the other surveillance camera captures the target object, based on the movement history and an identification result obtained by the identification unit.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

1. Security System 1

Figure 1:
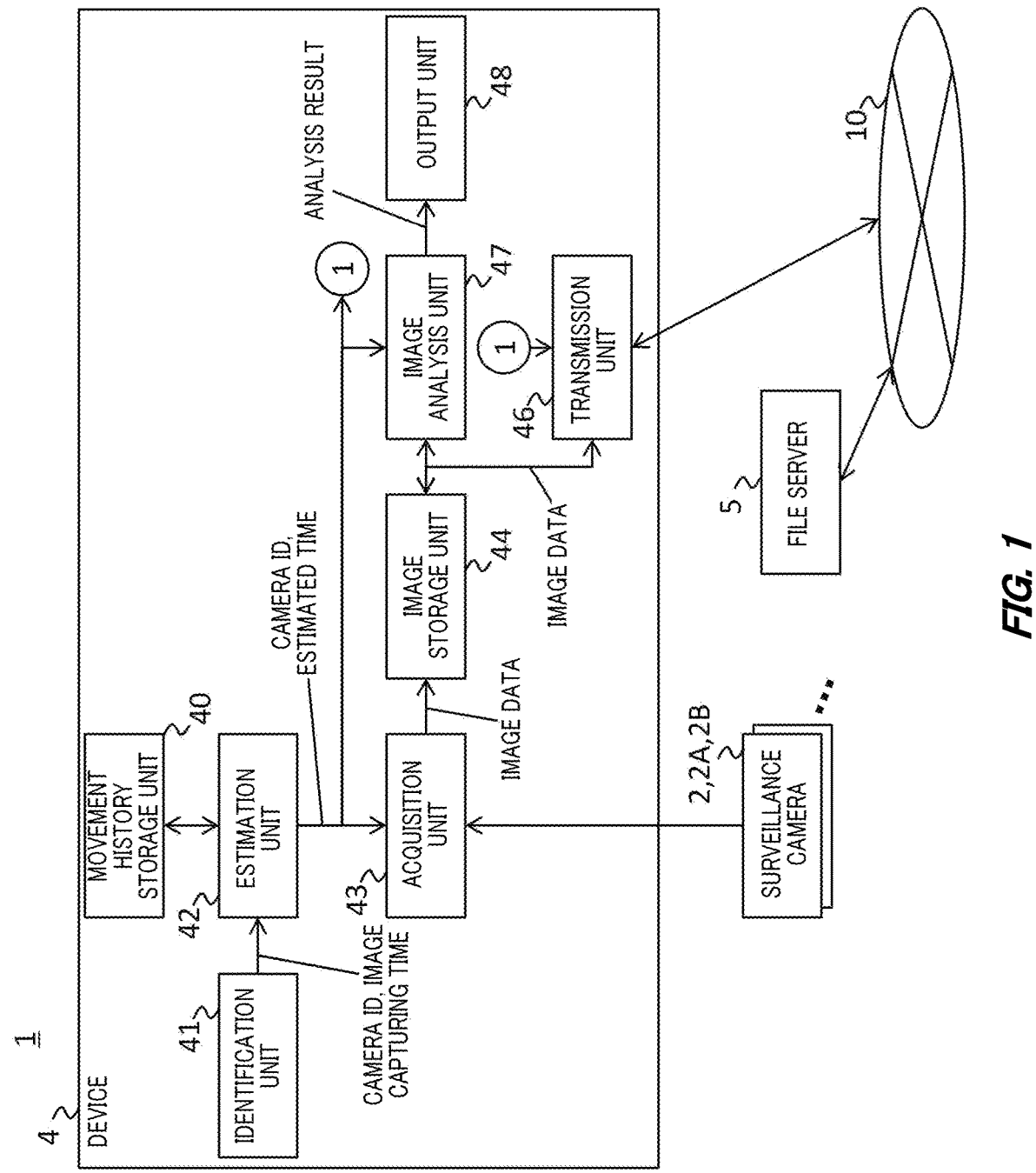
FIG. 1 shows a security system 1 according to the present embodiment.

FIG. 1 shows a security system 1 according to the present embodiment. The security system 1 includes a plurality of surveillance cameras 2, a device 4, and a file server 5.

Here, as an example in the present embodiment, in each configuration of the security system 1, each surveillance camera 2 and the device 4 may be directly connected, and the device 4 and the file server 5 may be connected via a communication network 10. The communication network 10 may be configured to include various networks such as the Internet, a wide area network (WAN), and a local area network, or a combination thereof. The communication network 10 may include at least one of a wired connection point and a wireless connection point. The communication network 10 may be realized by a dedicated line separated from a public line such as the Internet.

[1.1. Surveillance Camera 2]

The plurality of surveillance cameras 2 respectively capture images in separate image capturing areas. Each surveillance camera 2 may constantly capture an image to generate video image data. As an example, the surveillance camera 2 may capture the image at 30 frames per second. The surveillance camera 2 may be a visible light camera, or may be an infrared or ultraviolet (an X-ray as an example) camera.

The surveillance camera 2 may be able to supply captured image data to the device 4. The surveillance camera 2 may cause the captured image data to be stored in an internal storage area (not shown).

Note that the plurality of surveillance cameras 2 may be arranged along a path through which an object can move. The object may be a person, may be an animal such as a wild animal or a domestic animal, or may be a vehicle such as a car or a bicycle. The path may be a path in which the object can move in only one direction, or may be a path in which the object can move in both directions. The path may include a branch point and a merging point.

For example, each surveillance camera 2 may be arranged on a road or a parking lot, or may be arranged at a doorway, a passageway, or the like of a facility. The facility may be a plant, or may be a school, a house, a train station, an airport, a museum, a hospital, a store (as an example, a restaurant), or the like. An example of the plant includes: in addition to industrial plants relating to chemistry and biotechnology, and the like, plants for managing and controlling wellheads in a gas field, an oil field, and the like, and their surroundings; plants for managing and controlling power generation of hydroelectric power, thermal power, nuclear power, and the like; plants for managing and controlling energy harvesting from solar power, wind power, and the like; plants for managing and controlling water and sewage, dams, and the like; and the like. The doorway of the facility may be a doorway provided at a boundary between an inside and an outside of the facility, or may be a doorway provided at a boundary between one area and the other area inside the facility.

[1.2. Device 4]

The device 4 cooperates with the plurality of surveillance cameras 2 to support security of the facility. The device 4 includes a movement history storage unit 40, an identification unit 41, an estimation unit 42, an acquisition unit 43, an image storage unit 44, a transmission unit 46, an image analysis unit 47, and an output unit 48.

[1.2.1. Movement History Storage Unit 40]

The movement history storage unit 40 is an example of a first storage unit, and stores, when the object moves between the separate image capturing areas which are captured by the plurality of surveillance cameras 2, a plurality of movement histories of the object between the image data respectively captured by the surveillance cameras 2.

Here, the movement history of the object between the image data captured by the respective surveillance cameras 2 may be a transition history of the image data showing the object among the image data of the respective surveillance cameras 2. As an example in the present embodiment, the movement history of the object between the image data may be corresponding data, collected in chronological order for each object, between an image capturing time of the image data showing the object, and identification information (also referred to as a camera ID) of the surveillance camera 2 that has captured the image data.

[1.2.2. Identification Unit 41]

The identification unit 41 identifies, among the plurality of surveillance cameras 2, one surveillance camera 2 (also referred to as an identified surveillance camera 2A) that has captured a target object to track, and the image capturing time, according to an operation of an operator.

As an example in the present embodiment, the identification unit 41 may identify, as the identified surveillance camera 2A, the surveillance camera 2 corresponding to the camera ID which is input from the operator among the camera IDs of the respective surveillance cameras 2. The identification unit 41 may also identify the time which is input from the operator as the image capturing time of the target object by the identified surveillance camera 2A. Note that the identification unit 41 may have an input device (not shown) such as a touch panel, a keyboard, or a mouse operated by the operator, or may be externally connected to the input device.

The identification unit 41 may supply an identification result to the estimation unit 42. Note that the target object to track may be any object captured by any of the surveillance cameras 2, or may be a target object which is tracked by using the image data of the surveillance camera 2.

[1.2.3. Estimation Unit 42]

The estimation unit 42 estimates at least one other surveillance camera 2 (also referred to as an estimated surveillance camera 2B) that captures the target object and that is different from the identified surveillance camera 2A, among the plurality of surveillance cameras 2, and an estimated time when the estimated surveillance camera 2B captures the target object, based on the movement history stored in the movement history storage unit 40 and the identification result obtained by the identification unit 41.

Note that the estimated time when the estimated surveillance camera 2B captures the target object may be a time before a timing of the estimation made by the estimation unit 42. In this case, the meaning of the surveillance camera that captures the target object may include the surveillance camera that captured the target object, and the meaning of the estimated time when the target object is captured may include the image capturing time when the target object was captured.

Further, the estimated time when the estimated surveillance camera 2B is estimated to have captured the target object may be a time different from the image capturing time when the identified surveillance camera 2A captured the target object. As an example, the estimated time may be a time after the image capturing time. When the estimation unit 42 estimates a plurality of combinations of the estimated surveillance cameras 2B and the estimated times, the estimated time may be different from each other in the two or more combinations.

The estimation unit 42 may supply an estimation result (as an example in the present embodiment, the camera ID of the estimated surveillance camera 2B and the estimated time) to the acquisition unit 43, the transmission unit 46, and the image analysis unit 47.

[1.2.4. Acquisition Unit 43]

The acquisition unit 43 acquires the image data captured at the estimated time from the estimated surveillance camera 2B. When the plurality of combinations of the estimated surveillance cameras 2B and the estimated times are estimated by the estimation unit 42, the acquisition unit 43 may acquire, from the estimated surveillance camera 2B in each combination, the image data captured at the estimated time in the combination.

Further, the acquisition unit 43 acquires the image data captured at the image capturing time from the identified surveillance camera 2A. However, it should be noted that the acquisition unit 43 may acquire the image data from only one of the estimated surveillance camera 2B and the identified surveillance camera 2A. The acquisition unit 43 may supply the acquired image data to the image storage unit 44.

[1.2.5. Image Storage Unit 44]

The image storage unit 44 stores at least one of the image data captured by the estimated surveillance camera 2B at the estimated time, or the image data captured by the identified surveillance camera 2A at the image capturing time. As an example in the present embodiment, the image storage unit 44 may store both of the image data captured by the estimated surveillance camera 2B, and the image data captured by the identified surveillance camera 2A. When the plurality of combinations of the estimated surveillance cameras 2B and the estimated times are estimated by the estimation unit 42, the image storage unit 44 may store the image data captured by the estimated surveillance camera 2B in each combination at the estimated time in the combination.

[1.2.6. Transmission Unit 46]

The transmission unit 46 is an example of a first transmission unit, and transmits, to a preset destination, at least one of the image data captured by the estimated surveillance camera 2B at the estimated time, or the image data captured by the identified surveillance camera 2A at the image capturing time. When the plurality of combinations of the estimated surveillance cameras 2B and the estimated times are estimated by the estimation unit 42, the transmission unit 46 may transmit the image data captured by the estimated surveillance camera 2B in each combination at the estimated time in the combination.

The destination may be a file server 5 accessible from another device. However, it should be noted that the destination is not limited to this, and may be a security company that has installed the surveillance camera 2, may be an owner or management company of the facility, or may be the police in the area including the facility.

[1.2.7. Image Analysis Unit 47]

The image analysis unit 47 analyzes the image data. The image analysis unit 47 may respectively analyze the image data captured by the estimated surveillance camera 2B at the estimated time, and the image data captured by the identified surveillance camera 2A at the image capturing time. When the plurality of combinations of the estimated surveillance cameras 2B and the estimated times are estimated by the estimation unit 42, the image analysis unit 47 may analyze the image data captured by the estimated surveillance camera 2B in each combination at the estimated time in the combination.

The image analysis unit 47 may extract a feature of the target object by the analysis. When the target object is a person, the feature may be a location relationship of feature points of a face or a whole body, may be colors of eyes, skin, hair, or clothes, or may be a color or a shape of an accessory (as an example, glasses, an earring, a bag, or the like), or the like. When the target object is a car, the feature may be a vehicle type, a vehicle color, a vehicle number, or the like.

The image analysis unit 47 may supply the analysis result to the output unit 48. The image analysis unit 47 may supply, in a case where the target object is not shown in the image data captured by the estimated surveillance camera 2B at the estimated time, the output unit 48 with the analysis result which indicates the case. For example, the image analysis unit 47 analyzes the image data from the identified surveillance camera 2A to extract the feature of the target object, and when the object showing the same feature does not exist in the image data from the estimated surveillance camera 2B, the image analysis unit 47 may determine that the target object is not captured in the image data from the estimated surveillance camera 2B.

[1.2.8. Output Unit 48]

The output unit 48 is an example of a first output unit, and collectively outputs the features of the target object acquired by the image analysis unit 47 respectively from the image data captured by the estimated surveillance camera 2B at the estimated time, and the image data captured by the identified surveillance camera 2A at the image capturing time. The output unit 48 may display the feature of the target object on a monitor (not shown), or may transmit the feature of the target object to the above-mentioned destination via the transmission unit 46.

In addition to or instead of this, the output unit 48 may be an example of a second output unit, and may output an alert signal when the target object is not shown in the image data captured by the estimated surveillance camera 2B at the estimated time. Thereby, for example, when the surveillance cameras 2 are installed at a security gate in an airport or the like and a passageway ahead of the security gate, the alert signal is output according to a fact that a person who has passed through the security gate is not shown in the image data of the passageway ahead of the security gate and is not able to be tracked. The output unit 48 may display the alert signal on a monitor (not shown), or may transmit the alert signal to the above-mentioned destination via the transmission unit 46.

Note that the alert signal may include information in relation to the target object. As an example in the present embodiment, the information in relation to the target object may include at least one of the features of the information identified by the identification unit 41, the image data captured by the identified surveillance camera 2A at the image capturing time, or the target object of which the image data is extracted by the image analysis unit 47.

[1.3. File Server 5]

The file server 5 is accessible from another device different from the device 4 (as an example, a device in a security company that has installed the surveillance camera 2), and shares a stored file with the other device. The file server 5 may be accessible from a plurality of devices at the same time.

[1.4. Effect Obtained from Device 4]

With the above-described device 4, the identified surveillance camera 2A that has captured the target object according to the operation of the operator and the image capturing time are identified, and the estimated surveillance camera 2B that has captured the target object and the estimated time of image capturing are estimated based on the movement history of the object in the movement history storage unit 40 and the identification result obtained by the identification unit 41. Therefore, it is possible to save the trouble of searching for the target object among the image data and to facilitate tracking of the target object.

Further, at least one of the image data captured by the estimated surveillance camera 2B at the estimated time, or the image data captured by the identified surveillance camera 2A at the image capturing time is stored in the image storage unit 44, and thus it is possible to check, in the image data, at least one target object before and after the movement.

Further, the features of the target object respectively acquired from the image data are collectively output, and thus in comparison with a case where the feature of the target object acquired from a single image data is output, it is possible to acquire many features of the target object at once. Therefore, it is possible to further facilitate the tracking of the target object.

Further, the alert signal is output when the target object is not shown in the image data in which the target object is estimated to have been captured, and thus it is possible to detect at an early stage that the target object cannot be tracked.

Further, at least one of the image data captured by the estimated surveillance camera 2B at the estimated time, or the image data captured by the identified surveillance camera 2A at the image capturing time is transmitted to the preset destination, and thus it is possible to enhance accessibility to the image data obtained by capturing the target object.

Further, the surveillance camera 2 corresponding to the camera ID which is input from the operator is identified as the identified surveillance camera 2A, and the time which is input from the operator is identified as the image capturing time, and thus it is possible to identify the identified surveillance camera 2A and the image capturing time without taking, into the device 4, the image data in which the target object is shown.

[1.4. Operation of Device 4]

Figure 2:
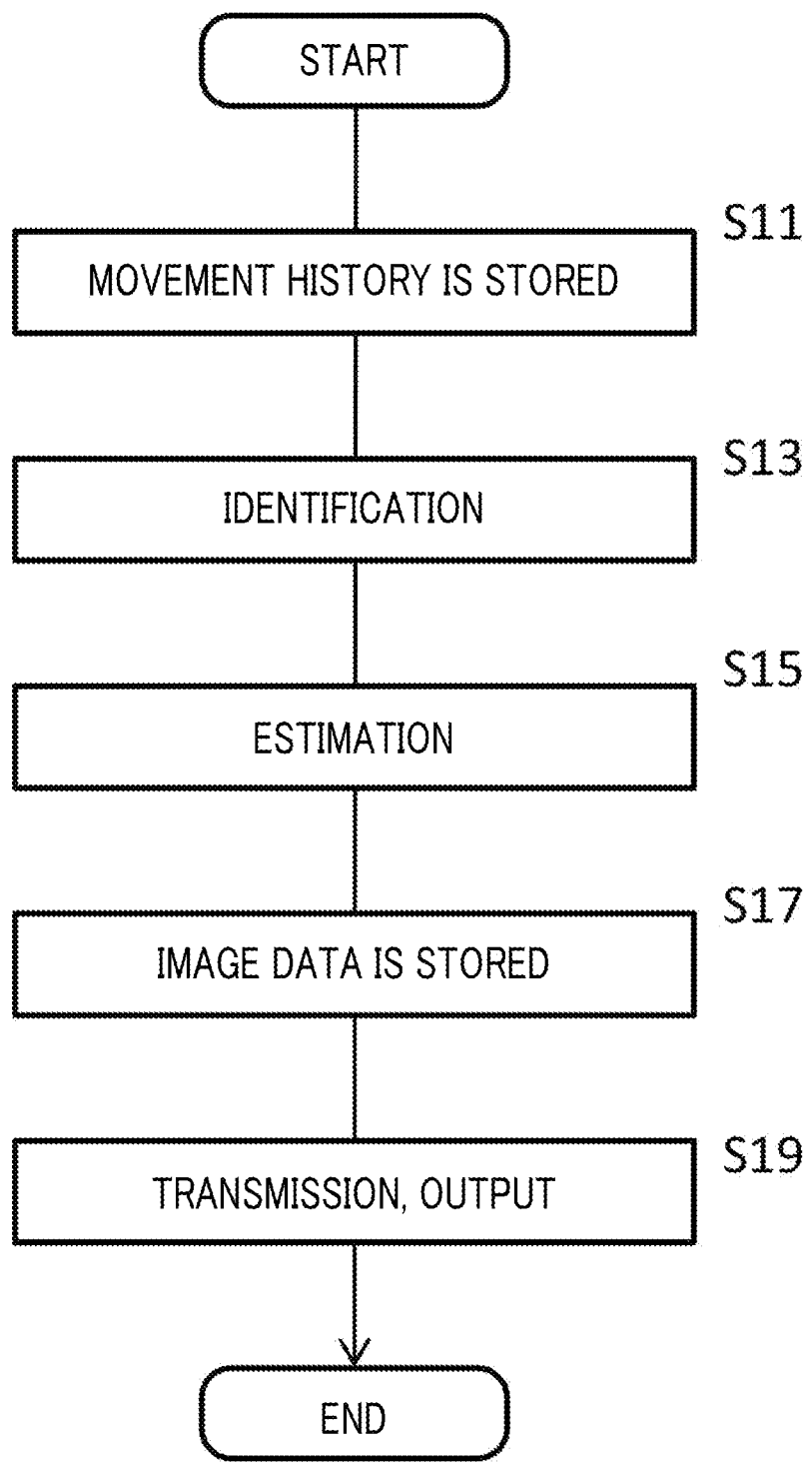
FIG. 2 shows an operation of a device 4.

FIG. 2 shows an operation of a device 4. The device 4 supports the security of the facility by performing processing of step S11 to step S19.

In step S11, the movement history storage unit 40 stores, when the object moves between the separate image capturing areas which are captured by the plurality of surveillance cameras 2, the plurality of movement histories of the object between the image data respectively captured by the surveillance cameras 2.

The movement history may be corresponding data, collected in chronological order for each object, between the image capturing time of the image data showing the object, and the identification information (also referred to as the camera ID) of the surveillance camera 2 that has captured the image data. Each corresponding data in the movement history may further include at least one of a movement direction or a movement speed of the object.

Each movement history may be created based on the image data captured by each surveillance camera 2 in advance before the device 4 starts the operation. For example, each movement history may be created by the image data captured by each surveillance camera 2 being image-analyzed to detect each object in the image data, and to collect, for each object, the image capturing time of the image data, and the camera ID of the surveillance camera 2 that has captured the image data. As an example in the present embodiment, the movement history may be created outside the device 4.

When the movement direction and the movement speed of the object are included in each corresponding data of the movement history, the movement direction and the movement speed may be calculated, by the image data captured by each surveillance camera 2 being image-analyzed, to be included in the data corresponding to the camera ID.

Note that the processing of step S11 may be performed only at a first operation of the device 4, and may not be performed at the second and subsequent operations.

In step S13, the identification unit 41 identifies, among the plurality of surveillance cameras 2, the identified surveillance camera 2A that captured the target object to track, and the image capturing time when the identified surveillance camera 2A captured the target object, according to the operation of the operator.

Further, as an example in the present embodiment, in the processing of step S13, the identification unit 41 further identifies at least one of the movement direction or the movement speed of the target object, according to the operation of the operator. For example, the identification unit 41 may identify the movement direction which is input from the operator (as an example, the direction from the image capturing area of a certain surveillance camera 2 toward the image capturing area of another surveillance camera 2) as the movement direction of the target object.

Further, the identification unit 41 may identify the movement speed based on a guide (as an example, standard, fast, slow, or the like) of the movement speed which is input from the operator, or may identify the movement speed based on information (as an example, gender or age) which is input from the operator and which can be related to the movement speed. The movement speed may be a speed range having a width.

In step S15, the estimation unit 42 estimates at least one estimated surveillance camera 2B that captured the target object, and the estimated time when the estimated surveillance camera 2B captured the target object, based on the movement history stored by the movement history storage unit 40 and the identification result obtained by the identification unit 41.

The estimation unit 42 may perform statistical processing on the plurality of movement histories to estimate the estimated surveillance camera 2B and the estimated time. For example, the estimation unit 42 may extract each movement history including the camera ID of the identified surveillance camera 2A from the plurality of movement histories (as an example in the present embodiment, the corresponding data, collected in chronological order for each object, between the image capturing time of the image data showing the object, and the camera ID of the surveillance camera 2 that has captured the image data) stored in the movement history storage unit 40. The extracted movement history may be the movement history of each object that has passed through the image capturing area of the identified surveillance camera 2A.

From each of the extracted movement histories, the estimation unit 42 may identify, as reference corresponding data, the corresponding data between the camera ID and the image capturing time, which includes the camera ID of the identified surveillance camera 2A, to extract at least one piece of the corresponding data after the reference corresponding data. The extracted corresponding data may indicate a time when the object that had passed through the image capturing area of the identified surveillance camera 2A was captured by any other surveillance camera 2.

The estimation unit 42 may calculate a time difference between the image capturing time of each of the extracted corresponding data, and the image capturing time of the reference corresponding data. As an example, when the image capturing time of the reference corresponding data is 12:00 and the image capturing time of the extracted corresponding data is 12:05, the estimation unit 42 may calculate the time difference as 5 minutes.

The estimation unit 42 may aggregate the combinations of the camera IDs of the corresponding data and the time differences calculated for the corresponding data, to generate statistical data. By using the generated statistical data, the estimation unit 42 may statistically determine the combination of the surveillance camera 2 that is estimated to have captured the object after capturing of the object by the identified surveillance camera 2A, and the time difference. As an example, by using the statistical data, the estimation unit 42 may calculate a probability distribution for each combination of the surveillance camera 2 and the time difference, to determine at least one combination showing a highest probability distribution.

In the present embodiment, in step S13, at least one of the movement direction or the movement speed of the target object is further identified, and thus the estimation unit 42 may estimate the estimated surveillance camera 2B and the estimated time by further using the identified movement direction and movement speed. For example, the estimation unit 42 may aggregate the combinations of the camera IDs, the movement directions, and the movement speeds of the corresponding data in the movement history, and the time differences calculated as described above for the corresponding data, to generate the statistical data. As an example, by using the generated statistical data, the estimation unit 42 may calculate the probability distribution for each combination of the surveillance camera 2, the movement direction, the movement speed, and the time difference, to determine at least one combination showing the highest probability distribution.

Then, the estimation unit 42 may set, as the estimated surveillance camera 2B, the surveillance camera 2 corresponding to the camera ID of the determined combination. Further, the estimation unit 42 may set, as the estimated time, the result obtained by adding the time difference of the determined combination to the image capturing time identified in step S13.

In step S17, the acquisition unit 43 acquires the image data captured by the estimated surveillance camera 2B at the estimated time, and the image data captured by the identified surveillance camera 2A at the image capturing time, to cause the acquired image data to be stored in the image storage unit 44.

In step S19, the transmission unit 46 transmits, to the preset destination (for example, the file server 5), at least one of the image data captured by the estimated surveillance camera 2B at the estimated time, or the image data captured by the identified surveillance camera 2A at the image capturing time.

In addition to or instead of this, in step S19, the image analysis unit 47 may respectively perform the image analyses on the image data captured by the estimated surveillance camera 2B at the estimated time, and the image data captured by the identified surveillance camera 2A at the image capturing time, and the output unit 48 may collectively output the acquired features of the target object. The output unit 48 may output, in a case where the target object is not shown in the image data captured by the estimated surveillance camera 2B at the estimated time, the alert signal which indicates the case.

With the above-described operation, at least one of the movement direction or the movement speed of the target object is further identified according to the operation of the operator, and thus it is possible to more accurately estimate the estimated surveillance camera 2B that captured the target object and the estimated time when the target object was captured.

2. Modification Example

Figure 3:
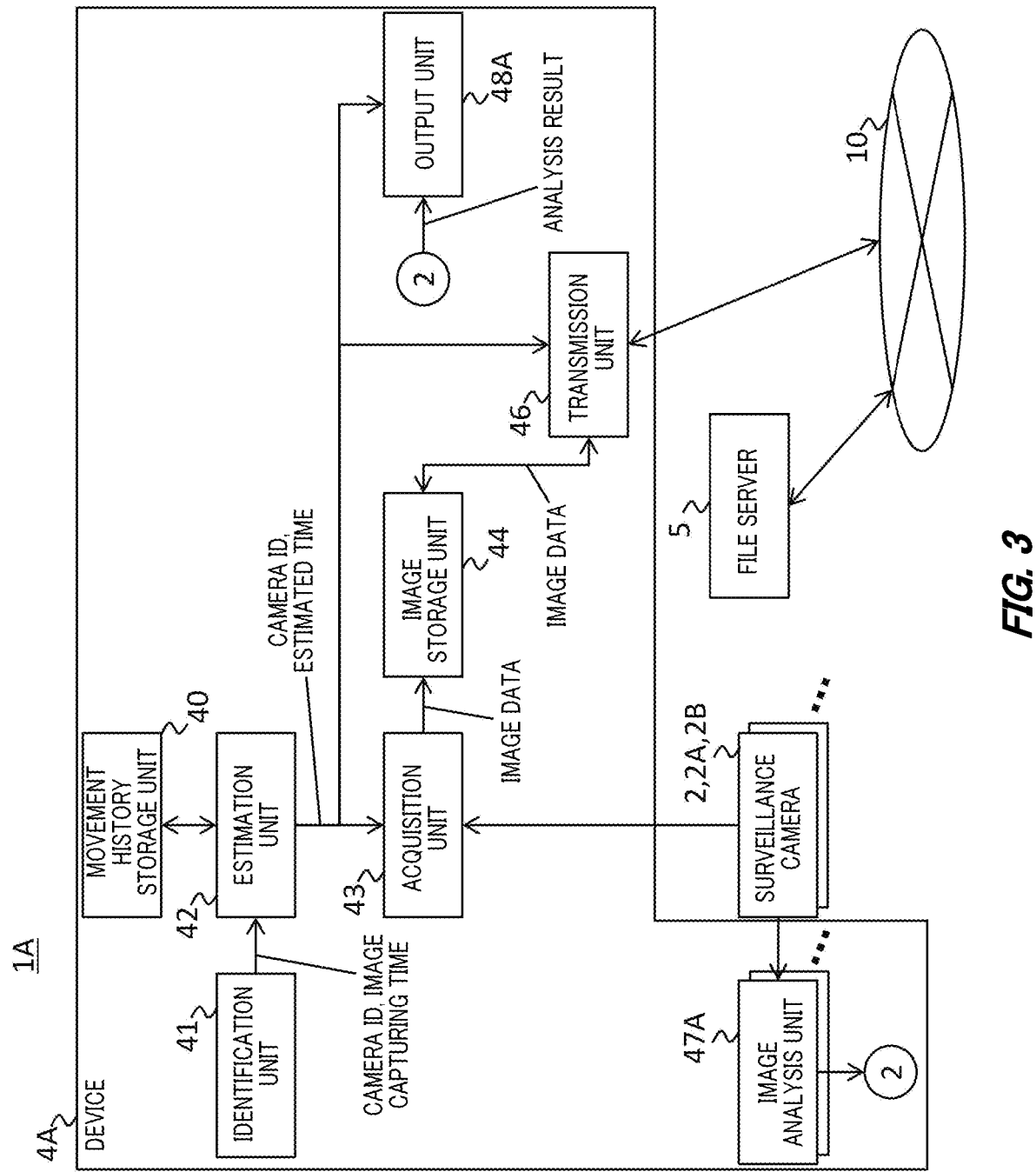
FIG. 3 shows a security system 1A according to a modification example.

FIG. 3 shows a security system 1A according to a modification example. A device 4A of the security system 1A has a plurality of image analysis units 47A and an output unit 48A. Note that in the security system 1A according to the present embodiment, the same reference numerals are given to those having substantially the same configuration as the security system 1 shown in FIG. 1, and the description thereof will be omitted.

The plurality of image analysis units 47A are each associated with one or more surveillance cameras 2, and as an example in the present modification example, the plurality of image analysis units 47A are each associated with one surveillance camera 2 on a one-to-one basis. Each image analysis unit 47A may be installed near the corresponding surveillance camera 2. Each image analysis unit 47A may analyze the image data captured by the corresponding surveillance camera 2, and supply the analysis result to the output unit 48A.

Based on the identification result obtained by the identification unit 41 and the estimation result obtained by the estimation unit 42, the output unit 48A may acquire the feature of the target object acquired from the image data captured by the identified surveillance camera 2A at the image capturing time, and the feature of the target object acquired from the image data captured by the estimated surveillance camera 2B at the estimated time, from the image analysis unit 47A corresponding to the identified surveillance camera 2A and the image analysis unit 47A corresponding to the estimated surveillance camera 2B. The output unit 48A may collectively output the acquired features.

With the device 4A according to the above-described modification example, it is possible to distribute a load of the image analysis since the plurality of image analysis units 47A are provided.

Note that each image analysis unit 47A may be provided with a GPS receiving device (not shown), which receives radio waves from a GPS satellite (not shown) to acquire location information of the image analysis unit 47A, and may supply the acquired location information to the estimation unit 42. The location information acquired by the GPS receiving device may indicate the location of the corresponding surveillance camera 2. In this case, the estimation unit 42 may perform the estimation by further using the location information of each surveillance camera 2. As an example, the estimation unit 42 may detect and estimate a location relationship of the plurality of surveillance cameras 2 from the location information of each surveillance camera 2. When each surveillance camera 2 is provided with the GPS receiving device, the estimation unit 42 may perform the estimation by using the location information acquired by the GPS receiving device of the surveillance camera 2.

3. Other Modification Example

Note that in the above-described embodiment and modification example, the devices 4, 4A are described to have the acquisition unit 43, the image storage unit 44, the transmission unit 46, the image analysis units 47, 47A, and the output unit 48; however, the devices 4, 4A may not have at least one of these.

Further, the estimation unit 42 is described to estimate, as the estimated time, the time after the image capturing time when the target object is captured by the identified surveillance camera 2A; however, in addition to or instead of this, a time before the image capturing time may be estimated as the estimated time.

Further, the estimation unit 42 is described to estimate, as the estimated time, the time before the timing of the estimation; however, in addition to or instead of this, the time after the timing of the estimation may be estimated as the estimated time. In this case, the estimation unit 42 may estimate at least one estimated surveillance camera 2B that will capture the target object in the future, and the estimated time when the estimated surveillance camera 2B will capture the target object, based on the movement history stored in the movement history storage unit 40 and the identification result obtained by the identification unit 41. In this case, the estimation unit 42 may output the estimation result via the output unit 48. As an example, the estimation result may be transmitted to the security company that has installed the surveillance camera 2, the owner of the facility, the management company of the facility, or the police in the area including the facility, or the like.

Further, the estimation unit 42 is described to perform the statistical processing on the movement history to estimate the estimated surveillance camera 2B and the estimated time; however, the estimated surveillance camera 2B and the estimated time may be estimated by other processing. For example, the estimation unit 42 may perform the estimation by using a model (not shown) which outputs, according to the input of the identification result (as an example in the present embodiment, the camera ID of the identified surveillance camera 2A that has captured the target object and the image capturing time) obtained by the identification unit 41, and at a timing thereafter (or before), the identification information of the estimated surveillance camera 2B that is estimated to have captured the target object, and the estimated time. In such a model, learning processing may be performed by using learning data including the plurality of movement histories. The model may be provided in the devices 4, 4A, or may be externally connected to the devices 4, 4A. When the model is provided in the devices 4, 4A, the learning processing of the model may be performed by a learning processing unit (not shown) in the devices 4, 4A.

Further, the acquisition unit 43 is described to acquire the image data captured by the estimated surveillance camera 2B at the estimated time; however, in addition to or instead of this, the acquisition unit 43 may respectively acquire, from the plurality of surveillance cameras 2, the image data captured by the surveillance camera 2. As an example, the acquisition unit 43 may acquire the image data captured by each surveillance camera 2 before the processing in step S13. In this case, the devices 4, 4A may be able to display the image data captured by any surveillance camera 2 at any time. Further, instead of or in addition to identifying the identified surveillance camera 2A and the image capturing time from the camera ID and the time which are input from the operator as described above in the processing of step S13, the identification unit 41 may identify, as the identified surveillance camera 2A, the surveillance camera 2 that captured the image data according to the operator specifying the target object in the image data, and identify, as the image capturing time, the time when the image data was captured. This makes it possible to facilitate the operation of the operator. Further, in this case, the identification unit 41 may further identify at least one of the movement direction or the movement speed of the target object by tracking the target object specified in the image data. This makes it possible to further facilitate the operation of the operator.

Further, the transmission unit 46 is described to transmit, to the preset destination, at least one of the image data captured by the estimated surveillance camera 2B at the estimated time, or the image data captured by the identified surveillance camera 2A at the image capturing time; however, in addition to or instead of this, the transmission unit 46 may transmit at least one of the location information of the image data captured by the estimated surveillance camera 2B at the estimated time, or the location information of the image data captured by the identified surveillance camera 2A at the image capturing time. The location information of the image data may be an address of the image data in the surveillance camera 2, the image storage unit 44, or the file server 5, or may be information including the camera ID and the image capturing time of the image data. In this case as well, it is possible to enhance accessibility to the image data obtained by capturing the target object.

Further, the image data, which is captured by the estimated surveillance camera 2B at the estimated time estimated by the estimation unit 42, is described to be provided to the image storage unit 44, the transmission unit 46, the image analysis unit 47, or the like; however, the image data which is captured by the estimated surveillance camera 2B within a time having a reference width (as an example, 5 minutes) including the estimated time may be provided. In this case, it is possible to provide the image storage unit 44 or the like with the image data in which the target object is clearly shown.

Further, the movement history storage unit 40 is described to store the movement history only at first operations of the devices 4, 4A; however, the storing may be performed each time the operations of the devices 4, 4A are started, or the storing may be performed each time the operations of the devices 4, 4A are started with a reference interval (as an example, one month). For example, the movement history may be generated by analyzing the image data of each surveillance camera 2 for each reference interval, to be stored, when the operations of the devices 4, 4A are started thereafter, in the movement history storage unit 40.

Further, the movement history is described to be generated outside the devices 4, 4A; however, the movement history may be generated inside the devices 4, 4A. In this case, the acquisition unit 43 may acquire, from each surveillance camera 2, the image data captured by the surveillance camera 2, and the movement history may be created by the image analysis units 47, 47A detecting each object in each image data by the image analysis to collect, for each object, the image capturing time of the image data, and the camera ID of the surveillance camera 2 that has captured the image data.

Further, various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

Computer-readable media may include any tangible device that can store instructions to be executed by a suitable device, as a result, the computer-readable medium having instructions stored in the tangible device comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD- ROM), a digital versatile disk (DVD), a Blu-ray (Registered Trademark) disc, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), C++ or the like, and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions is executed to create means for performing operations specified in the flowcharts or block diagrams. Examples of the processor include a computer processor, a processing unit, a microprocessor, a digital signal processor, a controller, a microcontroller, and the like.

Figure 4:
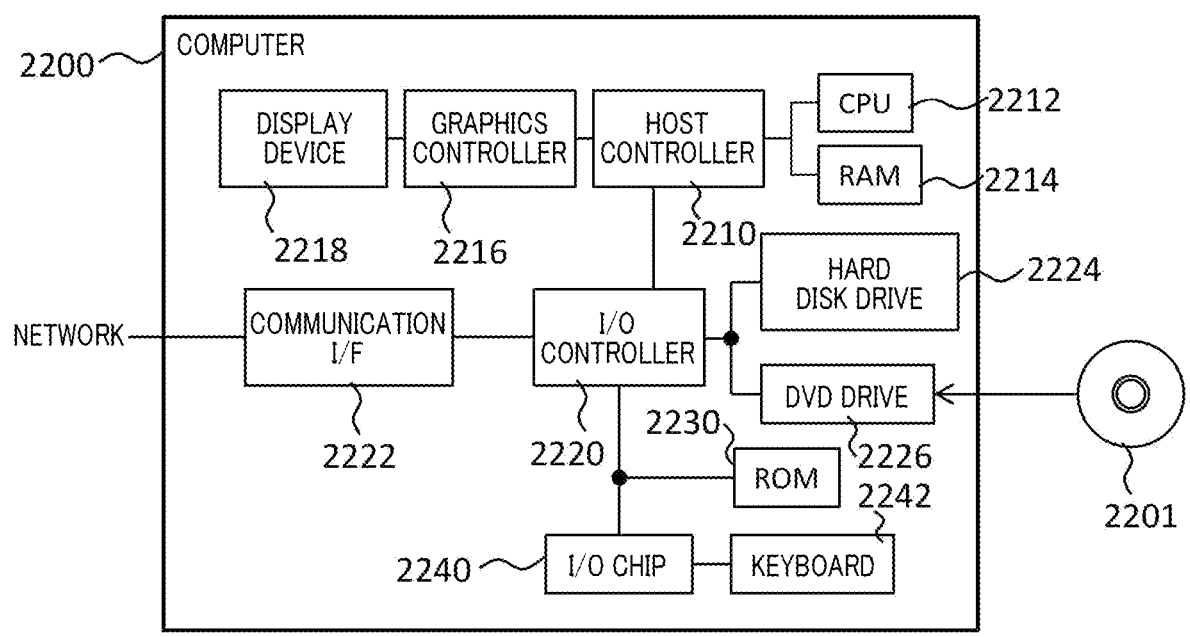
FIG. 4 shows an example of a computer 2200 in which a plurality of aspects of the present invention may be embodied entirely or partially.

FIG. 4 shows an example of a computer 2200 in which a plurality of aspects of the present invention may be embodied entirely or partially. A program that is installed in the computer 2200 can cause the computer 2200 to function as or perform operations associated with the apparatus according to the embodiment of the present invention, or one or more sections of the apparatus thereof, and/or can cause the computer 2200 to execute a process or steps of the process according to the embodiment of the present invention. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 performs communication with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, and the like.

A program is provided by computer-readable media such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the process written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, processing of information, condition determinations, conditional branch, unconditional branch, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable media on or near the computer 2200. In addition, a recording medium such as a hard disk or a RAM provided in a server system connected to a dedicated communication network or the Internet can be used as the computer-readable media, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 Security system
2 surveillance camera
4 device
5 file server
10 communication network
40 movement history storage unit
41 identification unit
42 estimation unit
43 acquisition unit
44 image storage unit
46 transmission unit
47 image analysis unit
48 output unit
2200 computer
2201 DVD ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. A device comprising:
a first storage unit configured to store, when an object moves between separate image capturing areas which are captured by a plurality of surveillance cameras, a plurality of movement histories of the object between image data respectively captured by the surveillance cameras;
an identification unit configured to identify, among the plurality of surveillance cameras, one surveillance camera that has captured a target object to track, and an image capturing time, according to an operation of an operator; and
an estimation unit configured to estimate at least one other surveillance camera that is different from the one surveillance camera and that captures the target object, among the plurality of surveillance cameras, and an estimated time when the other surveillance camera captures the target object, based on the movement history and an identification result obtained by the identification unit.

2. The device according to claim 1, comprising:
a second storage unit configured to store at least one of the image data captured by the other surveillance camera at the estimated time, or the image data captured by the one surveillance camera at the image capturing time.

3. The device according to claim 2, comprising:
a first transmission unit configured to transmit, to a preset destination, at least one of the image data captured by the other surveillance camera at the estimated time, or the image data captured by the one surveillance camera at the image capturing time.

4. The device according to claim 3, wherein
the second storage unit is configured to store the image data captured by the other surveillance camera at the estimated time, and the image data captured by the one surveillance camera at the image capturing time,
the device comprising:
an image analysis unit configured to analyze the image data; and
a first output unit configured to collectively output features of the target object acquired by the image analysis unit respectively from the image data captured by the other surveillance camera at the estimated time, and the image data captured by the one surveillance camera at the image capturing time.

5. The device according to claim 3, wherein
the second storage unit is configured to store the image data captured by the other surveillance camera at the estimated time, and the image data captured by the one surveillance camera at the image capturing time,
the device comprising:
an image analysis unit configured to analyze the image data; and
a second output unit configured to output an alert signal in a case where the target object is not shown in the image data captured by the other surveillance camera at the estimated time.

6. The device according to claim 2, wherein
the second storage unit is configured to store the image data captured by the other surveillance camera at the estimated time, and the image data captured by the one surveillance camera at the image capturing time,
the device comprising:
an image analysis unit configured to analyze the image data; and
a first output unit configured to collectively output features of the target object acquired by the image analysis unit respectively from the image data captured by the other surveillance camera at the estimated time, and the image data captured by the one surveillance camera at the image capturing time.

7. The device according to claim 2, wherein
the second storage unit is configured to store the image data captured by the other surveillance camera at the estimated time, and the image data captured by the one surveillance camera at the image capturing time,
the device comprising:
an image analysis unit configured to analyze the image data; and
a second output unit configured to output an alert signal in a case where the target object is not shown in the image data captured by the other surveillance camera at the estimated time.

8. The device according to claim 2, comprising:
a second transmission unit configured to transmit, to a preset destination, at least one of location information of the image data captured by the other surveillance camera at the estimated time, or location information of the image data captured by the one surveillance camera at the image capturing time.

9. The device according to claim 2, wherein the identification unit is configured to:
identify, as the one surveillance camera, a surveillance camera corresponding to identification information which is input from the operator among identification information of the respective surveillance cameras; and
identify, as the image capturing time, a time which is input from the operator.

10. The device according to claim 2, comprising:
an acquisition unit configured to acquire, from each surveillance camera, the image data captured by the surveillance camera, wherein
the identification unit is configured to identify, as the one surveillance camera, the surveillance camera that captured the image data, according to the operator specifying the target object in the image data, and identify, as the image capturing time, a time when the image data was captured.

11. The device according to claim 2, wherein the identification unit is configured to further identify at least one of a movement direction or a movement speed of the target object, according to the operation of the operator.

12. The device according to claim 1, comprising:
a second transmission unit configured to transmit, to a preset destination, at least one of location information of the image data captured by the other surveillance camera at the estimated time, or location information of the image data captured by the one surveillance camera at the image capturing time.

13. The device according to claim 1, wherein the identification unit is configured to:
identify, as the one surveillance camera, a surveillance camera corresponding to identification information which is input from the operator among identification information of the respective surveillance cameras; and
identify, as the image capturing time, a time which is input from the operator.

14. The device according to claim 1, comprising:
an acquisition unit configured to acquire, from each surveillance camera, the image data captured by the surveillance camera, wherein
the identification unit is configured to identify, as the one surveillance camera, the surveillance camera that captured the image data, according to the operator specifying the target object in the image data, and identify, as the image capturing time, a time when the image data was captured.

15. The device according to claim 1, wherein the identification unit is configured to further identify at least one of a movement direction or a movement speed of the target object, according to the operation of the operator.

16. The device according to claim 1, wherein the estimation unit is configured to perform statistical processing on the plurality of movement histories to estimate the other surveillance camera and the estimated time.

17. The device according to claim 1, wherein the estimation unit is configured to estimate identification information of the other surveillance camera, and the estimated time by using a model in which learning processing is performed by using learning data including the plurality of movement histories, and which outputs, according to an input of the identification result obtained by the identification unit, the identification information of the other surveillance camera, and the estimated time.

18. A system comprising:
the device according to claim 1; and
the plurality of surveillance cameras configured to capture images in the separate image capturing areas.

19. A method comprising:
storing, when an object moves between separate image capturing areas which are captured by a plurality of surveillance cameras, a plurality of movement histories of the object between image data respectively captured by the surveillance cameras;
identifying, among the plurality of surveillance cameras, one surveillance camera that has captured a target object to track, and an image capturing time, according to an operation of an operator; and
estimating at least one other surveillance camera that is different from the one surveillance camera and that captures the target object, among the plurality of surveillance cameras, and an estimated time when the other surveillance camera captures the target object, based on the movement history and an identification result obtained by the identifying.

20. A non-transitory computer-readable recording medium having recorded thereon a program that causes a computer to perform steps of:
storing, when an object moves between separate image capturing areas which are captured by a plurality of surveillance cameras, a plurality of movement histories of the object between image data respectively captured by the surveillance cameras;
identifying, among the plurality of surveillance cameras, one surveillance camera that has captured a target object to track, and an image capturing time, according to an operation of an operator; and
estimating at least one other surveillance camera that is different from the one surveillance camera and that captures the target object, among the plurality of surveillance cameras, and an estimated time when the other surveillance camera captures the target object, based on the movement history and an identification result obtained by the step of identifying.

\* \* \* \* \*